UNITED STATES PATENT OFFICE.

DENNIS T. IGOU AND DALE C. IGOU, OF SPRINGFIELD, OHIO, ASSIGNORS TO THE IGOU MANUFACTURING COMPANY, OF SPRINGFIELD, OHIO, A CORPORATION OF OHIO.

WRAPPING-MACHINE.

1,173,274.  Specification of Letters Patent.  Patented Feb. 29, 1916.

Application filed October 21, 1912. Serial No. 726,94.

*To all whom it may concern:*

Be it known that we, DENNIS T. IGOU and DALE C. IGOU, citizens of the United States, residing at Springfield, in the county of Clark and State of Ohio, have invented certain new and useful Improvements in Wrapping-Machines, of which the following is a specification.

This invention relates to improvements in wrapping machines, and more particularly to machines for wrapping stick candy, although the constructions will be equally applicable for wrapping other articles of similar form; the invention relating more particularly to a machine which places the wrapping material upon the articles in a spiral form, twists the wrapper between adjacent articles and then severs the twisted part of the wrapper.

An object of the invention is to devise a machine of the character referred to, which will be simple in construction and effective in operation.

In the accompanying drawings, Fig. 13 is an enlarged end view in detail of a portion of the receptacle and the ejector mechanism.

Like parts are represented by similar characters of reference in the several views.

The general construction of the machine consists of a receptacle into which the articles to be wrapped are placed; mechanism for ejecting the articles one at a time from the lower part of the receptacle; a series of feeding and rotating devices for feeding and rotating the articles from one end of the machine to the other; to cause a continuous wrapper to be wound thereon and twisted between adjacent articles; and severing mechanism for severing the twisted part of the wrapper.

1 represents the bed of the machine, which is supported upon suitable legs 2.

*Receptacle.*—The receptacle, represented by 3, is formed of a length preferably substantially the same as that of the articles to be wrapped and the sides of the receptacle are converged toward the bottom so as to form a narrow elongated discharge opening substantially equal to the diameter and length of said articles. The receptacle is pivotally hung from the upper ends of arms 4 projecting upwardly from the end of the bed. Pivotally secured to a lug 5 as at 6, projecting from the side of the receptacle near its lower end is an arm 7, the free apertured end of which encircles an eccentric 8 connected with a gear 9, mounted on a stud 11, secured to the bracket 12. This gear 9 is driven from the main shaft 10, through the medium of the gears 33 and 34, hereinafter described, so that the receptacle will be vibrated rapidly to agitate the articles therein and prevent their clogging.

*Ejector mechanism,* (Figs. 2, 3, 13 and 14.)—Means are provided for ejecting the article one at a time from the bottom of the receptacle into a position to be engaged by the feeding devices. Located directly beneath the bottom of the hopper is a longitudinally-arranged sprocket chain 13 carrying projecting fingers 14, preferably two in number. This sprocket chain is continuously revolved by the sprocket wheel 15 on the shaft 16, which shaft is located in suitable bearings at the upper end of brackets (not shown). The shaft 16 is driven from the main shaft 10 through the medium of the beveled gear 18 on said shaft, beveled pinion 14$^a$ on the short vertical shaft 19, spiral gear 20 on the short vertical shaft 21 and spiral gear 22 on said main shaft 10. The short vertical shafts 19 and 20 are supported in suitable bearings 23 and 24 on the bed plate 1 and are operatively connected together by any ordinary form of friction clutch 25. The sprocket chain 13 passes about an idle sprocket 26 on a shaft 27 located in the upper end of brackets 28. As a result of this construction, the fingers 14, engaging the end of the articles forces the same toward the feeding devices. Inasmuch as the ejector necessarily must move with a greater speed than the feeding devices, it sometimes happens that the articles being fed by the ejector will contact the preceding article in the feed rolls, in which event, the clutch 25 will slip.

*Feeding and rotating mechanism,* (Figs. 1, 2, 9, 10 11 and 12.)—There is shown in the drawings four sets of feeding and rotating devices, which we have designated as A, B, C, and D. Each of these feeding and rotating devices is constructed exactly alike with the exception of the ratio of the gearing, which will be explained hereinafter, so that a description of one will suffice for all. Clamped in the upper end of a bifurcated standard 29 is a bushing 30 having at one end thereof a stationary circular rack 31. Journaled in the bushing 30 is a sleeve 32 carrying at one end thereof a pinion 33 meshing with a gear 34 on the main shaft 10. The opposite end of the sleeve 32 has secured thereto a bifurcated head 35 in which is journaled a pair of feed rolls 36 and 37; these feed rolls being grooved on their periphery which is preferably formed of soft rubber. Also journaled in the head 35 is a pair of short shafts 38 and 39. The shaft 38 has at one end thereof a pinion 40 in mesh with the rack 31 and at the other end thereof a beveled pinion 41 in mesh with the beveled gear 42 connected with the feed roll 36. The short shaft 39 has at one end thereof a pinion 43 in mesh with the rack 31 and at the other end thereof a beveled pinion 44 in mesh with the beveled gear 45 connected with the feed roll 37. The result of this construction is that as the machine is operated, the sleeve 32 will be given a rotary movement through the medium of the pinion 33 and gear 34 so as to rotate the head 35 which carries the feed rolls, and by reason of the connection of the feed rolls with the stationary rack 31, through the medium of the gearing described, the feed rolls will be revolved about their own axes. Therefore, as the stick of candy or other article to be wrapped is delivered to these feed rolls, it will not only be fed through the same but will also be given a rotary or spinning movement. The ratio of the gearing in each of these respective feeding and rotating devices is such that the article being wrapped is fed faster at certain points in its passage through the same for the purpose of separating the articles to permit the material formed in the wrappers to be twisted between the articles. The ratio of the gearing is also such that certain of the devices are rotated faster than the others to perform the twisting operation. For instance, the devices marked B rotate at the same speed as the devices marked A, but feed faster so as to cause an initial separation of the articles. The devices marked C also rotate at the same speed as device B, but preferably feed faster than the devices B, to cause a further separation of the articles. The devices marked D rotate faster than C, to perform the twisting operation, but feed slower so that the articles being wrapped are brought closer together to take out the tautness in the wrapping material to permit of this twisting by compensating for the shortening of the wrapper occasioned by the twist.

*Wrapping mechanism.*—The wrappers $w$ are applied to the articles between the devices B and C. A continuous roll of paper $p$ is mounted on a reel 51, supported on the standard 50, this reel being arranged diagonally with respect to the feeding and rotating devices so that the paper will be fed at an angle to cause it to be wrapped on the articles in a spiral manner and may be adjustable by reason of the slotted opening 50$^a$ to obtain the proper angularity. The reel preferably has a friction device (not shown) to place a tension on the paper, and in order to prevent the tension of the paper from drawing the article being wrapped out of line with the feeding rollers, we provide a longitudinally-arranged roller 48, mounted in a U-shaped frame 47, which frame is pivotally supported in standards 46 extending upwardly from the bed 1, the construction being such that the roller 48 lies along that side of the article being wrapped upon which the paper reel is located. There is also supported on said brackets in line with the feed rollers, a support for the articles passing through the roller, which support is in the nature of a roller 49 journaled in the standards 46. Inasmuch as the rollers 48 and 49 are arranged to rotate, unnecessary friction between the rotating article and the said rollers is obviated.

Figures 1, 15, 16:
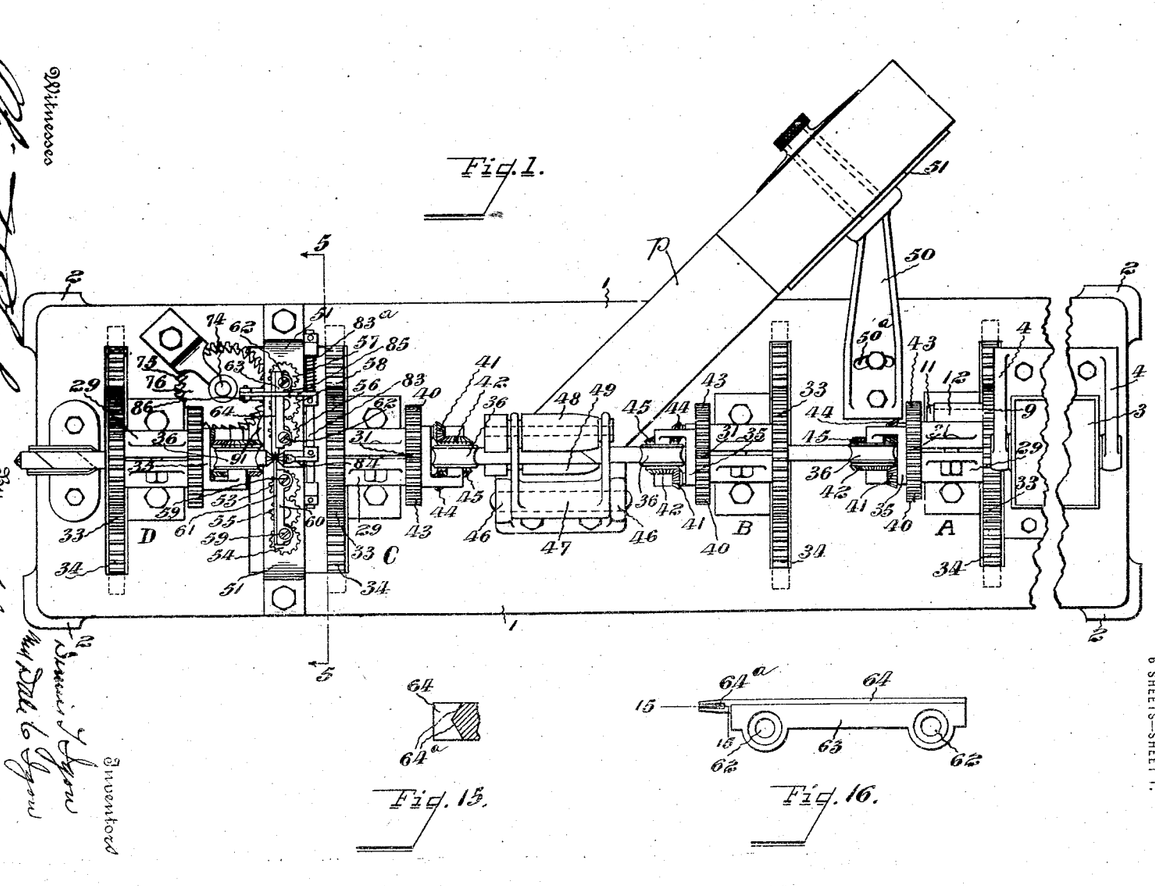
Figure 1 is a top plan view of a machine embodying the improvements.
Fig. 15 is a detail of the bifurcated severing member, being a section on the line 15—15 of Fig. 16.
Fig. 16 is a top plan of the bifurcated severing member.
Figure 2:
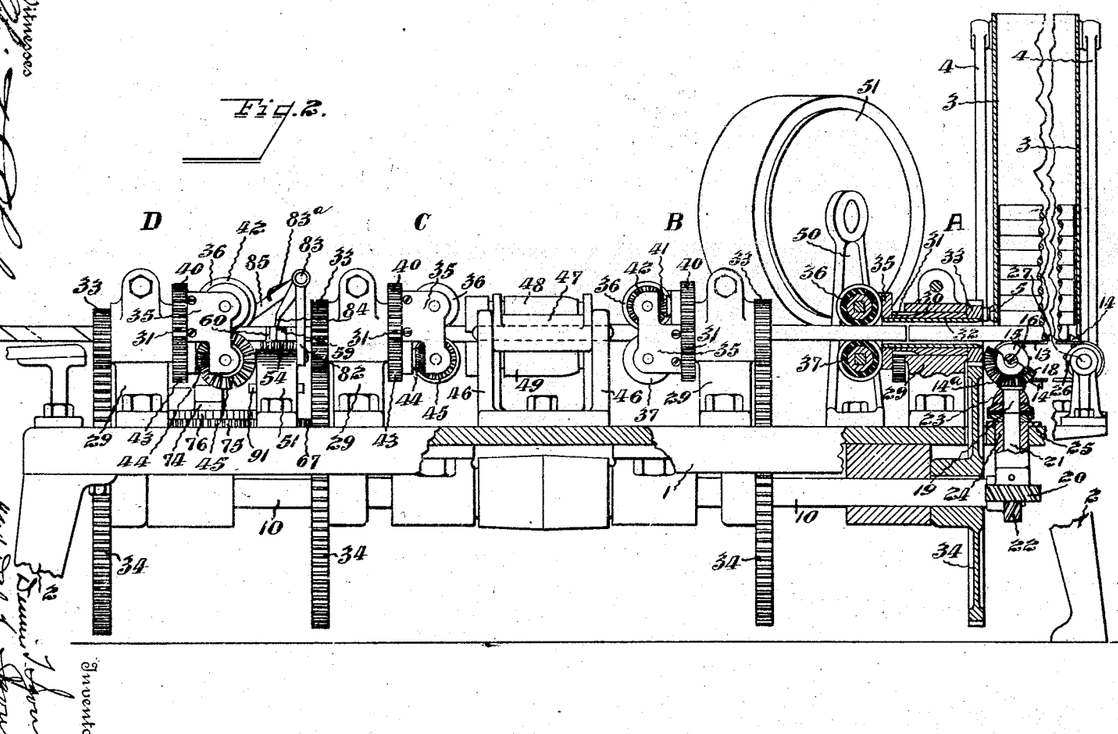
Fig. 2 is a side elevation of the same with a portion of the machine broken away and shown in section.
Figure 3:
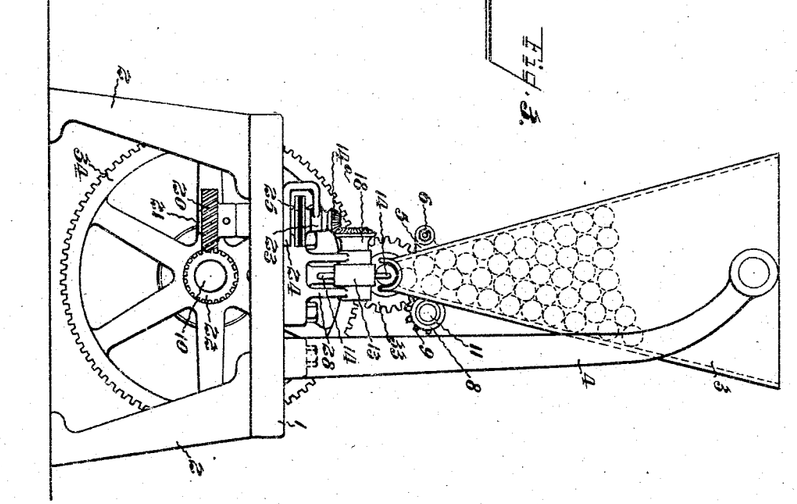
Fig. 3 is an end elevation of the same.
Figure 4:
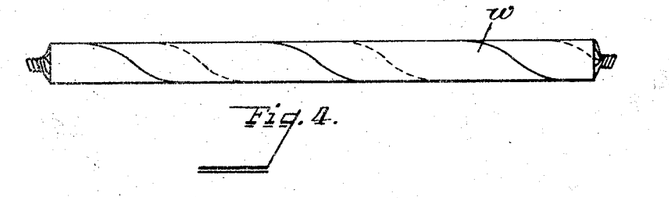
Fig. 4 is a view of a finished product of the machine.
Figure 5:
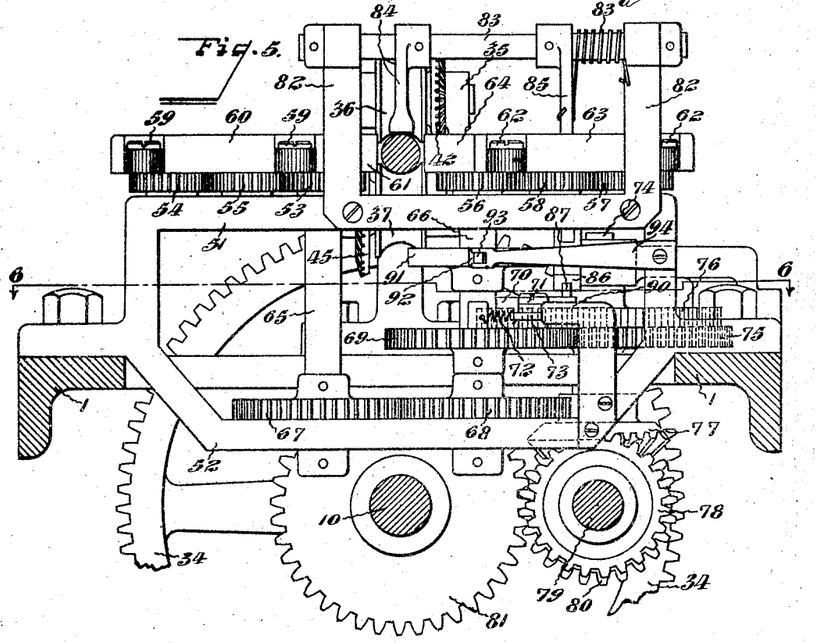
Fig. 5 is a section on the line 5—5 of Fig. 1 showing the severing mechanism.
Figures 6, 7:
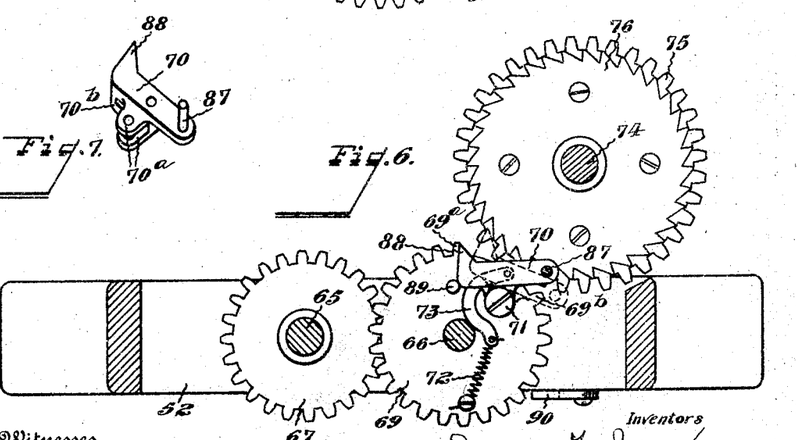
Fig. 6 is a section on the line 6—6 of Fig. 5.
Fig. 7 is a detail of a part of the severing mechanism.

*Severing mechanism.*—As before stated, the severing of the wrappers is performed after the same has been twisted between adjacent articles and this severing mechanism is located between the feeding and rotating devices marked C and D. Located on the main bed 1, and extending transversely across the same between the respective devices C and D, is a supporting bridge consisting of upper and lower supporting members 51 and 52 (Fig. 5 for detail). Rotatably mounted upon the upper side of the support 51 is a pair of gears 53 and 54, geared together by an intermediate gear 55 so as to rotate in unison. Rotatably mounted upon the opposite side of the support 51 is a second pair of gears 56 and 57 likewise geared together by an intermediate gear 58 so as to rotate in unison. Eccentrically pivoted to the gears 53 and 54 by pivot studs 59, is a bar 60 carrying a severing member 61. Eccentrically pivoted to the gears 56 and 57 by pivot studs 62 is a bar 63 carrying a severing member 64. The severing member 64 is formed with a bifurcated end to receive the cutting edge of the blade 61 as shown in Figs. 1, 15 and 16, the bifurcated portion acting as an abutment for the twisted part of the wrapper during the severing operation. This construction obviates the necessity of fine adjustment of the severing members as in the case of shearing cutters. In order to prevent the bifurcated portion of the member 64 from becoming clogged by fine particles of the wrapping material which are forced into the same during the severing operation, the rear wall of this bifurcated portion is formed with two inclined faces $64^a$ which extend from a central point laterally and rearwardly so as to form in effect laterally-flared passage-ways for the escape of the particles of wrapping material. The cutting edges of these severing members normally stand apart closely adjacent the path of movement of the article being wrapped and means are provided for throwing the severing edges together to perform the severing operation just at the time when the central portion of the twisted part of the wrapper comes opposite the same. In order to accomplish this, provision is made for imparting one complete revolution to the gears which carry these severing members, thereby imparting a reciprocating movement to the members, due to the manner of eccentrically pivoting said members to the gears, and in order that this severing movement of the members may take place at the proper moment, means are provided for throwing the member carrying gears into engagement with their operating mechanism, which moves continuously, by tripping devices which are controlled by the passages of the wrapped particles through the machine. Each of the gears 53 and 56 is connected with a shaft 65 and 66, journaled in the supporting members 51 and 52 and geared together at their lower ends so as to rotate in opposite directions at the same speed by gears 67 and 68. Connected to one of these shafts, in this case the one 66, is a mutilated gear 69, the teeth thereof being removed from the tooth $69^a$ to the tooth $69^b$, as shown in Fig. 6. Pivotally connected to this mutilated gear 69 is a pawl 70, the pivotal connection being made through the medium of the pivot screw 71 upon which the ears $70^a$ of the pawl are journaled, these ears being located centrally of the pawl. The pawl is held in its normal position, shown in Fig. 6, by a spring 72, connected at one end to the gear 69 and at the other end to pawl through the medium of a curved link 73, which link extends through a slotted portion $70^b$ of the pawl; the construction being such that this spring not only acts to hold the pawl in normal position, but will also hold it in tripped position as hereinafter more fully explained.

Suitably supported in the bed 1 is a vertically extending shaft 74, which carries just above the bed plate and in line with the gear 69, a gear 75, having connected therewith a ratchet wheel 76 which stands in line with the pawl 70. Means are provided for continuously rotating this gear 75 and ratchet wheel 76, while the machine is in motion, through the medium of a beveled gear 77 connected to the lower end of said shaft; the beveled gear 78 on the short countershaft 79, suitably supported from the under side of the bed 1; gear 80 on said counter-shaft 79; and gear 81 on the main shaft 10.

Rotatably mounted in standards 82, projecting upwardly from the supporting member 51, is a rock shaft 83 carrying a trip finger 84, said rock shaft being impelled in one direction by a spring $83^a$ so as to cause the free end of the trip finger 84 to lie with a yielding pressure upon the wrapper and wrapped article. Also connected with the rock-shaft 83 is an arm 85 carrying at its free end a spring-pressed pawl 86, free to yield upwardly. Extending upwardly from the pawl 70 is a pin 87, this pin being located on the opposite end of said pawl from the tooth 88 thereof and being adapted to lie in the path of movement of the pawl on the free end of the arm 85.

Figures 8, 9, 10, 11, 12:
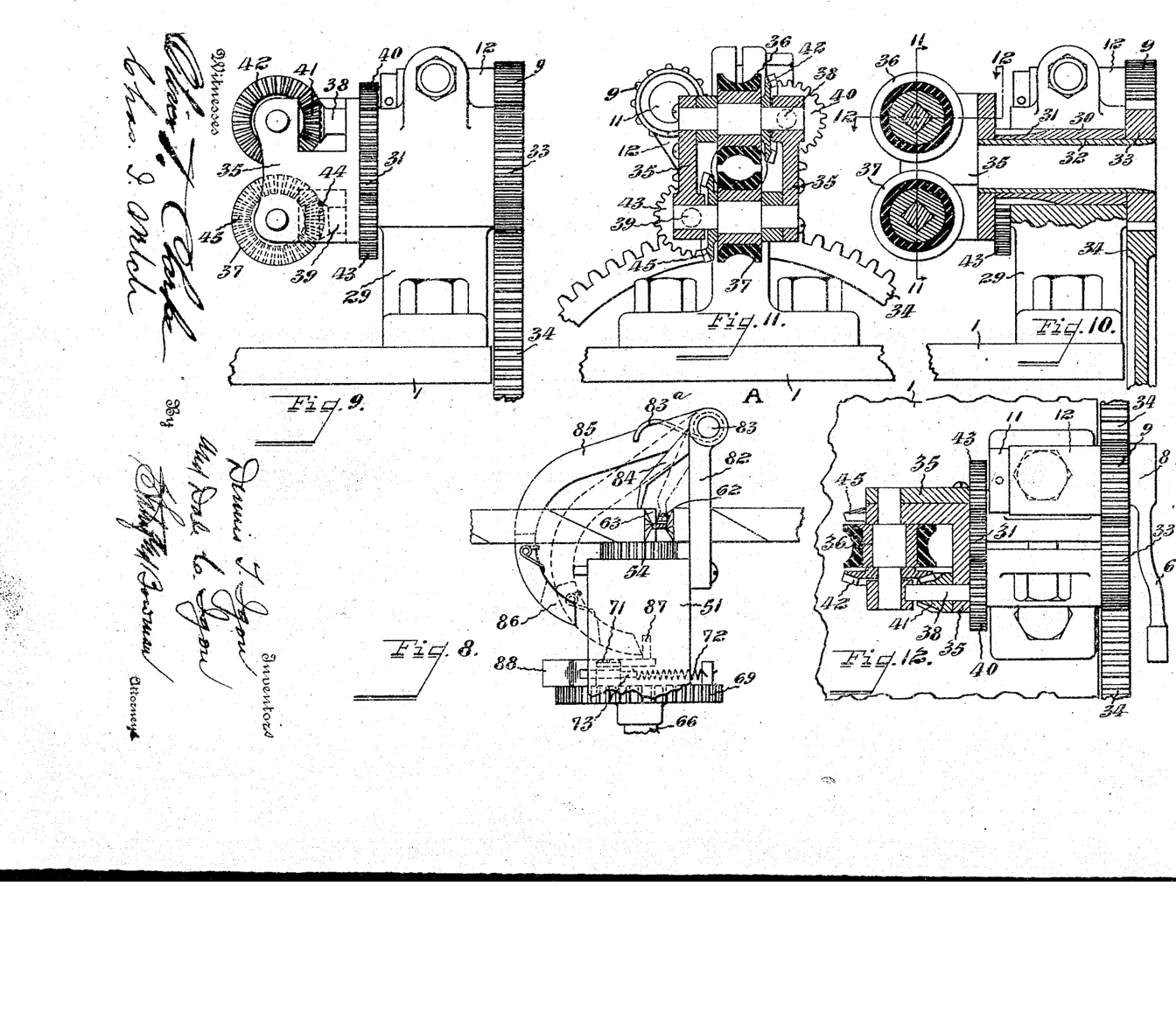
Fig. 8 is an enlarged view in detail of that part of the severing mechanism shown in Fig. 2.
Fig. 9 is an enlarged side elevation of one of the feeding devices for the work, the feeding device shown being the one which will be later referred to as the first set.
Fig. 10 is a longitudinal section of another one of the feeding devices, the one shown being also what will be hereinafter referred to as the first set.
Fig. 11 is a vertical section on the line 11—11 of Fig. 10.
Fig. 12 is a transverse section on the line 12—12 of Fig. 10.
Figure 14:
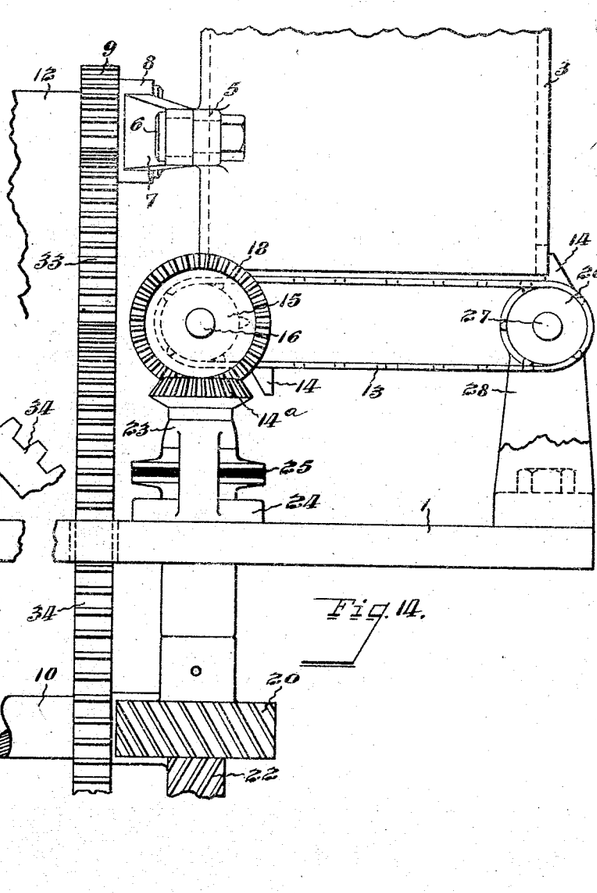
Fig. 14 is an enlarged side elevation of a portion of the receptacle and the ejector mechanism.
Figure 15:
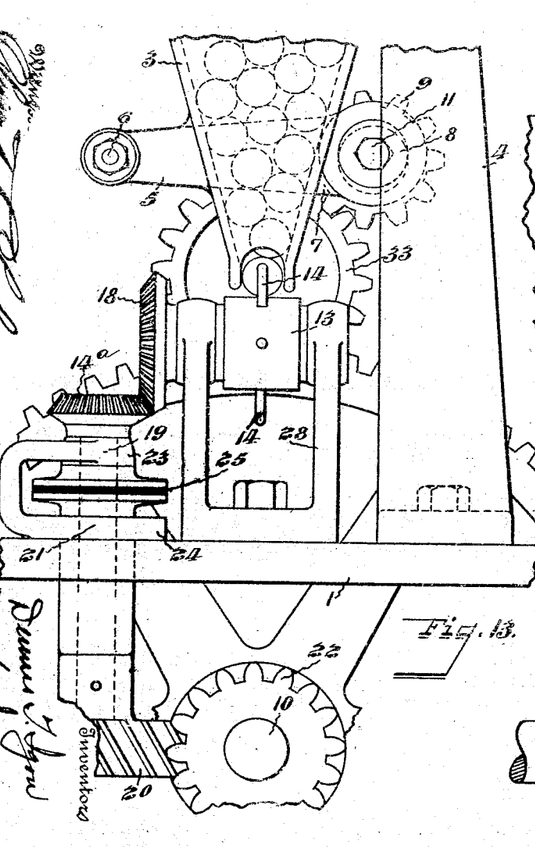

The trip finger 84, riding along the wrapped article and wrapper, normally holds the arm 85 and its pawl away from the pin 87, but as the twisted part of the wrapper passes under this trip finger 84, the parts will be permitted to drop, as shown in dotted lines in Fig. 8, due to the influence of the spring $83^a$, causing the pawl on the arm 85 to strike the pin 87 on the pawl 70 and throw the tooth 88 into engagement with the continuously rotating ratchet wheel 76, the pawl being held in this position by the spring 72, which now acts upon the other side of the pivotal point of said pawl. This causes the mutilated gear 69 to rotate until its teeth mesh with the teeth of the gear wheel 75, whereupon the gear wheel 69 will be further rotated until the mutilated part thereof is reached, thus disengaging said gear 69 from the gear 75 and arresting its course. In the meanwhile, the pawl 70 has been thrown back to its normal position against the stop pin 89 by reason of the fact of the tail end thereof having contacted, during the course of the revolution of the gear 69, with a projection 90, extending upwardly from the supporting member 52. It may be stated that the gear 75 and ratchet wheel 76 are provided with the same number of teeth so located with respect to each other that the proper meshing of gears 75 and 69 is insured. The rates of gearing is such that as the severing blades sweep in to sever the twist in the wrapper, the average speed of the forward movement of the same will be substantially the same as the speed of the traveling articles and wrappers so as to prevent the blades from contacting the ends of the wrapped articles and thus interfering with the travel of the same.

The pin 87 on the pawl 70 will be returned to its normal position before the arm 85 and its pawl have been moved back to their normal position by reason of the trip arm 84 riding again upon the top of the wrapped article, and it is because of this that the pawl 86 has been provided at the free end of the arm 85; the pin 87 riding under and lifting up this pawl 86 as it passes it upon its return movement. In order to prevent overthrow of the parts, there is located upon the shaft 66 a disk 91 having therein a notch 92 into which falls the friction roller 93 located upon the free end of the spring arm 94 connected to a side portion of the supporting members 51 and 52; the friction roller riding about the disk as the gear 69 rotates, but dropping into the notch so as to arrest the gear in its normal position and thus insure one complete revolution being imparted thereto.

*General operation.*—In operation, the receptacle is filled with the articles to be wrapped, and these articles are ejected one at a time from the lower end of the same into the first set of feeding and rotating devices, which it should be understood, are located directly in line with the bottom of the receptacle. From the first set of feeding rolls the articles pass to the second set, which as before stated, feed faster than the first set to produce a separation between the articles. From the second set of feeding rolls the articles pass into the third set, which it will be remembered feed faster than the second set so as to still further separate the articles. The paper is fed between the second and third sets and as the articles rotate in the manner before described this paper is wound about the same in a spiral direction. The articles are next fed to the fourth set of feeding and rotating devices. As before explained, this fourth set rotates at a greater speed than the first set and this causes the wrapping material between adjacent articles to be twisted. The severing devices are located between the third and fourth sets of feeding devices, and as the twisted part of the wrapper arrives at the proper point, the trip device, dropping down upon the twisted part of the wrapper, throws the severing devices into operation, thus severing the wrapper at that point.

While we have shown four sets of feeding and rotating devices yet the same result might be accomplished by the use of but three sets of these devices; the necessary separation between the articles being wrapped being secured between the devices designated B and C.

Having thus described our invention, we claim:—

1. In a wrapping machine, means for advancing the articles to be wrapped, means for applying in a spiral manner a continuous wrapper thereto, means for twisting the wrapper between adjacent articles, and means for severing the twisted part of the wrapper.

2. In a wrapping machine, means for advancing the articles to be wrapped, means for rotating said articles to cause the wrapper to be wound thereon, the speed of the rotation of each article at one point in its advancement being increased to cause the wrapper to be twisted, and means for severing the twisted part of said wrapper.

3. In a wrapping machine, a series of feeding and rotating devices for advancing and rotating the articles to be wrapped to cause a wrapper to be wound about the same, the rotary speed of certain of said devices being greater than the others to cause the wrapper between adjacent articles to be twisted, and means for severing the twisted part of said wrapper.

4. In a wrapping machine, a series of feeding and rotating devices for feeding and rotating the articles to be wrapped to cause a continuous wrapper to be wound about the same, the speed of certain of said devices being greater than that of the others to cause a separation between the articles and to form a twist in the wrapper between adjacent articles, and means for severing the twisted part of said wrapper.

5. In a wrapping machine, a series of feeding and rotating devices to advance and rotate the articles to be wrapped to cause a continuous wrapper to be wound about the same, the speed of certain of said devices being greater than the others to cause a separation between adjacent articles and also a twist in the wrapper between said articles, the feeding speed of the last device in the series being decreased over that of the adjacent device to cause the wrapped articles to approach each other at that point in the advancement of the same, and means for severing the twisted part of the wrappers.

6. In a wrapping machine, a series of feeding and rotating devices, each device consisting of a rotating head having a pair of rotating feeding rolls to advance the articles to be wrapped, and means for rotating said head to rotate the articles to be wrapped to cause a continuous wrapper to be wound about the same, the rotary movement of one of said heads being faster than that of the preceding head to cause a twist in the wrapper between adjacent articles, and means for severing the twisted part of said wrapper.

7. In a wrapping machine, means for advancing the articles to be wrapped, means for applying in a spiral manner a continuous wrapper thereto, means for forming twists in said wrapper between adjacent articles, and means for severing said twists during the advancing movement of said articles.

8. In a wrapping machine, means for advancing the articles to be wrapped, means for applying a continuous wrapper thereto, means for forming twists in said wrapper between adjacent articles, and means controlled by the wrapped articles for severing said twists during the advancing movement of said articles.

9. In a wrapping machine, means for advancing the articles to be wrapped, means for applying a continuous wrapper thereto, means for twisting the wrapper between adjacent articles, and means under the control of the articles and wrappers for severing the twisted part of the wrapper.

10. In a wrapping machine, means for advancing the articles to be wrapped, means for rotating said articles to cause the wrapper to be wound thereon, and for twisting the wrapper between adjacent articles, severing devices, and a trip actuated by the twisted part of the wrapper to throw said severing devices into operation to sever said twisted part of the wrapper.

11. In a wrapping machine, means for advancing the articles to be wrapped, means for applying in a spiral manner a continuous wrapper thereto, means for twisting the wrapper between adjacent articles, normally-inoperative severing devices together with means for actuating the same, and means for throwing said severing devices into operation at a certain point in the advancement of said articles and wrappers to sever the twisted part of said wrapper.

12. In a wrapping machine, means for advancing the articles to be wrapped, means for applying a continuous wrapper thereto, means for twisting the wrapper between adjacent articles, intermittently operating severing devices, means under the control of the wrapped articles for throwing said severing devices into operation to sever the twisted part of said wrapper, and means for automatically throwing said severing devices out of operation.

13. In a wrapping machine for advancing and wrapping articles in a continuous wrapper provided with means for twisting the wrapper between adjacent articles, severing devices, a continuously rotating gear, means for throwing said severing devices into operative relation with said rotating gear to cause said devices to sever the twisted part of the wrapper at a certain point in the advancement of the wrapped articles, and means for automatically disconnecting said severing devices from said gear.

14. In a wrapping machine for advancing and wrapping articles in a continuous wrapper provided with means for twisting the wrapper between adjacent articles, movable cutters located adjacent the line of travel of said wrapped articles, a continuously operating mechanism, means for throwing said cutters into operative relation with said mechanism whenever a twisted part of said wrapper arrives at a point adjacent said cutters to cause said cutters to sever said twisted part of said wrapper, and means for automatically disengaging said cutters from said operating mechanism after the severing operation.

15. In a wrapping mechanism for advancing and wrapping articles in a continuous wrapper provided with means for twisting the wrapper between adjacent articles, movable cutters located adjacent the line of travel of said wrapped articles, a continuously operating mechanism, means controlled by the wrapped articles for throwing said cutters into operative relation with said operating mechanism whenever a twisted part of said wrapper arrives at a point adjacent said cutters to cause said cutters to sever said twisted part of said wrapper, and means for disengaging said cutters from said operating mechanism after the severing operation.

16. In a wrapping machine for advancing and wrapping articles in a continuous wrapper provided with means for twisting the wrapper between adjacent articles, two oppositely arranged severing members adapted to coact with each other located adjacent the line of travel of said wrapped articles, each of said severing members being eccentrically connected with two rotating members, a continuously operating mechanism, means for throwing one of the rotating members of each severing member into operative relation with said continuously operating mechanism whenever a twisted part of said wrapper arrives at a point adjacent said severing members, and means for disconnecting said rotating members from said operating mechanism at the end of one complete revolution of said rotating members.

17. In a wrapping machine for advancing and wrapping articles in a continuous wrapper provided with means for twisting the wrapper between adjacent articles, two movable severing members adapted to coact with each other located adjacent the line of travel of said wrapped articles, each of said severing members being eccentrically connected with two rotating members, a continuously operating mechanism, tripping devices operated by the moving articles and wrappers to throw said rotating members into operative relation with said continuously operating mechanism, and means for disconnecting said rotating members from said operating mechanism at the end of one complete revolution of said rotating members.

18. In a wrapping machine for advancing and wrapping articles in a continuous wrapper provided with means for twisting the wrapper between adjacent articles, movable severers located adjacent the line of travel of said wrapped articles, a continuously rotating gear, a gear having one portion thereof devoid of teeth, the plain portion of said gear normally standing adjacent said continuously rotating gear, and means for throwing said mutilated gear into mesh with said contiuously rotating gear whenever a twisted part of said wrapper arrives at a point adjacent said severers.

19. In a wrapping machine for advancing and wrapping articles in a continuous wrapper provided with means for twisting the wrapper between adjacent articles, movable cutting devices located adjacent the line of travel of said wrapped articles, a continuously rotating gear, a ratchet wheel rotatable with said gear, a gear having one portion thereof devoid of teeth, the plain portion of said gear normally standing adjacent said continuously rotating gear, a pivoted pawl on said mutilated gear in line with said ratchet wheel, means for throwing said pawl into engagement with said ratchet wheel whenever a twisted portion of said wrapper arrives at a point adjacent said cutting devices to cause said mutilated gear to be thrown into engagement with said continuously rotating gear, whereby there is imparted to said mutilated gear one complete revolution, and means connecting said mutilated gear with said cutting devices for causing one complete operation of said cutting devices.

20. In a wrapping machine for advancing and wrapping articles in a continuous wrapper provided with means for twisting the wrapper between adjacent articles, movable cutting devices located adjacent the line of travel of said wrapped articles, a continuously rotating gear, a ratchet wheel rotatable with said gear, a second gear having one portion thereof devoid of teeth operatively connected with said cutting devices, the plain portion of said mutilated gear normally standing adjacent said continuously rotating gear, a pivoted pawl on said mutilated gear adjacent the plain portion thereof, tripping devices operated by the movement of the wrapped articles for throwing said pawl into engagement with said ratchet wheel whenever a twisted portion of said wrapper arrives at a point adjacent said cutting devices whereby said mutilated gear will be given a movement to cause its teeth to engage with said continuously rotating gear and thus cause a complete revolution to be imparted to said mutilated gear and one complete operation given to said cutting devices, and means for throwing said pawl to normal position and for arresting said mutilated gear at the end of one complete revolution.

21. In a wrapping machine, a series of feeding and rotating devices adapted to feed and rotate the articles to be wrapped so as to cause a continuous wrapper to be applied to said articles between two of said feeding and rotating devices, and a guide for the articles to be wrapped located between said devices at the side of the line of travel of said articles to resist the tension of the wrapper.

22. In a wrapping machine, a series of feeding and rotating devices adapted to feed and rotate the articles to be wrapped so as to cause a continuous wrapper to be applied to said articles between two of said feeding and rotating devices, and a friction roller extending between said devices adjacent the line of travel of said articles to form a guide for said articles to resist the tension of the wrapper.

23. In a wrapping machine, a series of feeding and rotating devices to feed and rotate the articles to be wrapped to cause a continuous wrapper to be applied to the same between two of said devices, a roller located between said devices beneath the line of travel of said articles to form a support for the same, and a roller also located between said devices at the side of the line of travel of said articles for resisting the tension of said wrapper.

24. In a wrapping machine, means for advancing the articles to be wrapped, means for applying a continuous wrapper thereto, means for forming twists in said wrapper between adjacent articles, and means immovable in the direction of travel of said articles and controlled by the same for severing said twists during the advancing movement of said articles.

25. In a wrapping machine, means for advancing the articles to be wrapped, means for rotating said articles to cause the wrapper to be wound thereon, means for twisting the wrapper between adjacent articles, severing devices immovable in the direction of travel of said articles, and a trip actuated by the twisted part of the wrapper to throw said severing devices into operation to sever said twisted part of the wrapper.

In testimony whereof, we have hereunto set our hands this 16th day of October, 1912.

DENNIS T. IGOU.
DALE C. IGOU.

Witnesses:
OLIVER F. CLARKE,
CHAS. I. WELCH.